(No Model.) 2 Sheets—Sheet 1.
A. M. HOFMANN & C. B. VAN HORN.
PROCESS OF AND APPARATUS FOR CHARGING LIQUIDS WITH GAS.
No. 538,833. Patented May 7, 1895.
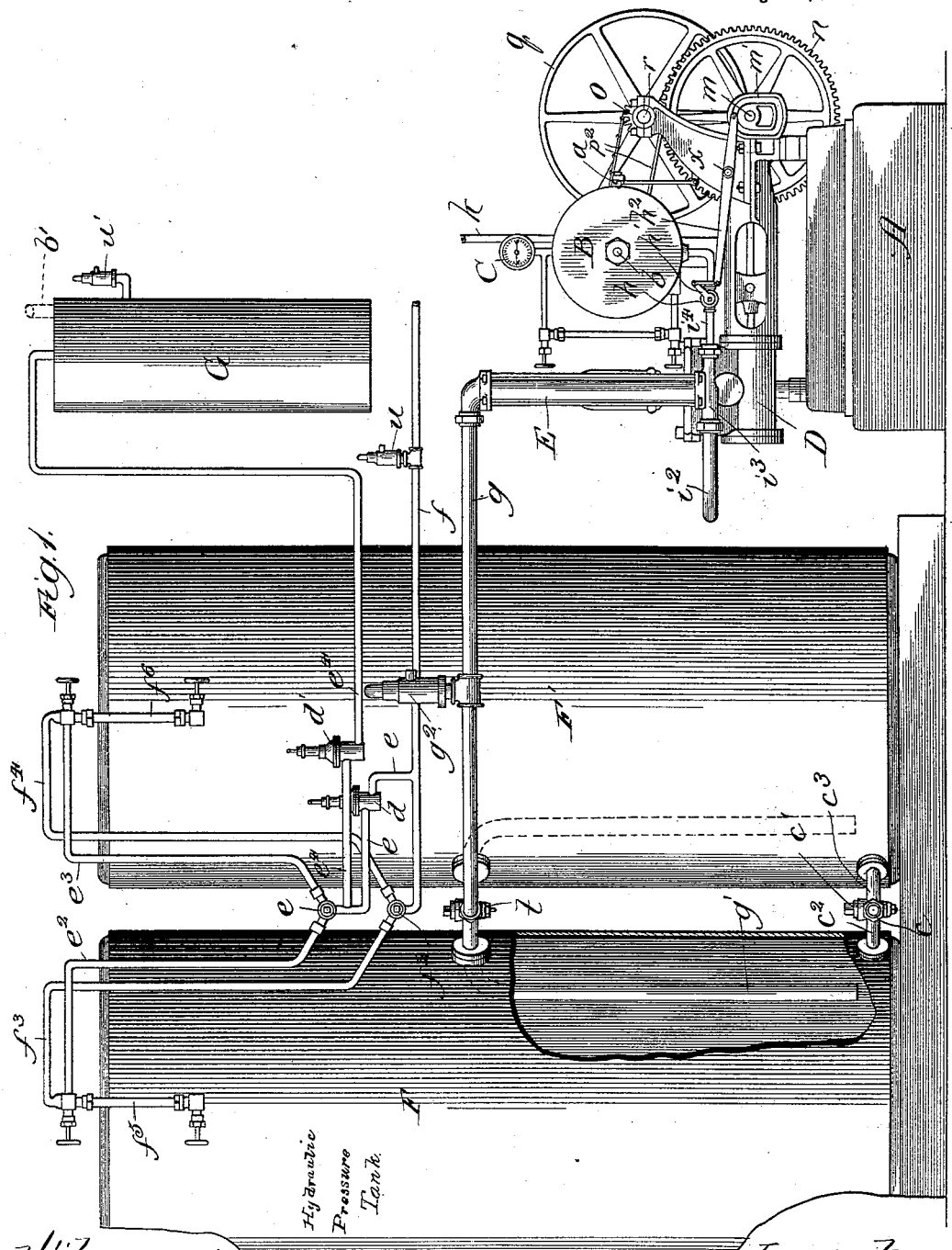

(No Model.) 2 Sheets—Sheet 2.
A. M. HOFMANN & C. B. VAN HORN.
PROCESS OF AND APPARATUS FOR CHARGING LIQUIDS WITH GAS.
No. 538,833. Patented May 7, 1895.
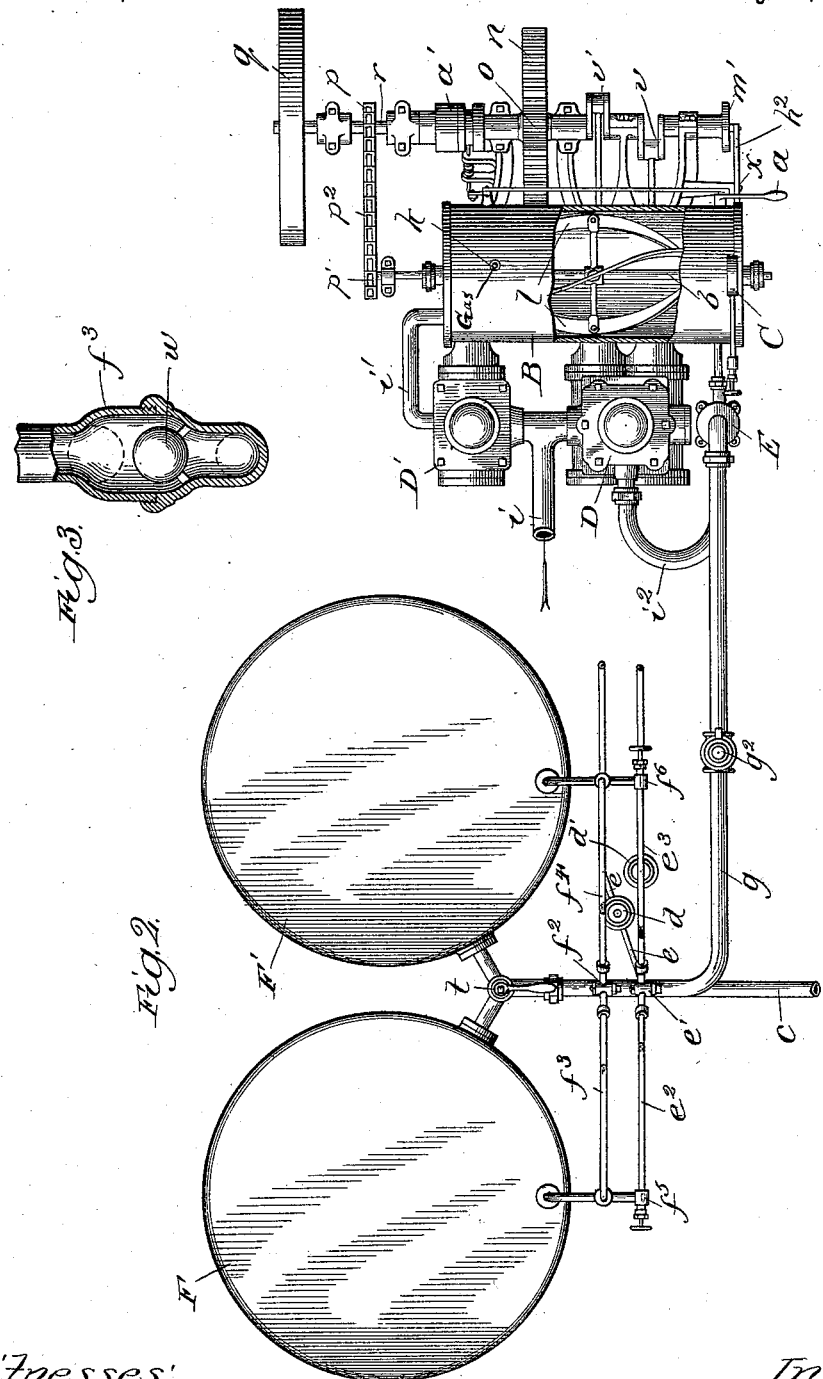

UNITED STATES PATENT OFFICE.

ALVES M. HOFMANN AND CHARLES B. VAN HORN, OF CHICAGO, ILLINOIS; SAID VAN HORN ASSIGNOR TO SAID HOFMANN.

PROCESS OF AND APPARATUS FOR CHARGING LIQUIDS WITH GAS.

SPECIFICATION forming part of Letters Patent No. 538,833, dated May 7, 1895.

Application filed October 15, 1894. Serial No. 525,984. (No model.)

*To all whom it may concern:*

Be it known that we, ALVES M. HOFMANN and CHARLES B. VAN HORN, citizens of the United States, residing at Chicago, in the county of Cook and State of Illinois, have invented a new and useful Improvement in Processes of and Apparatus for Charging Liquids with Gas, of which the following is a specification.

We have especially devised our invention for charging beer with carbonic acid gas, and for that reason, although our improvement is applicable to charging liquids generally with gas, we confine the description hereinafter contained to its application to carbonating beer.

Our primary object is so to carbonate beer that the gas shall become so intimately incorporated with, or absorbed by, the liquid that it shall not readily separate therefrom either in the packages (barrels or kegs) from which the beer is drawn or in the vessels from which it is drunk, thereby preventing the beer from becoming flat, or causing it to maintain its liveliness, for an exceptionally long time even when exposed to the air.

To practice our improved process, we proceed, generally stated, by forcing the beer, (taking it preferably direct from the ruh cask) into a holder, which may be adapted to have the beer racked off from it; and in so forcing the beer we periodically inject into it, against an adequate counterpressure, a liquid, which may also be beer, supercharged with carbonic acid gas. It is, however, within the spirit of our invention to effect the carbonating in any other suitable manner than with charged liquid. The beer thus mixed with gas-charged liquid is continuously forced into the holder against a suitably high counterpressure, say of air, till the holder is filled with the charged liquid, which thus as the filling proceeds displaces the counterpressure-medium at the pressure of the latter. After the holder has been thus filled to its capacity with finished liquid, the operation of forcing the beer into it is continued to greatly increase the pressure of liquid therein, which has the effect of causing the gas to be absorbed by the beer in the holder, or to become so intimately incorporated with the beer, that the latter will retain it, and thus be prevented from becoming flat, or from losing its liveliness, for an indefinitely long time.

We have devised, for practicing our improved process, the apparatus illustrated in the accompanying drawings, in which—

Figure 1 is a view of the apparatus, in side elevation, partly broken; Fig. 2, a plan view of the same; and Fig. 3, a broken sectional view, enlarged, of a ball-valve detail.

A denotes a suitable foundation or bed for the pumping and gas-charging mechanism. At the rear of the bed is journaled a shaft $r$ carrying at one end a belt-pulley $q$ at which to gear it to the driving-power (not shown), and carrying also a sprocket wheel $p$ and a pinion $o$, which meshes with a cog-wheel $n$ on a counter crank-shaft $m$ and carrying on its axis a cam $m'$.

B is an agitator comprising a cylinder supported on the bed A to contain the supercharged liquid, and containing a rotary shaft $b$ provided with mixing blades $l$ and connected at a sprocket-wheel $p'$ on one end, by a chain $p^2$, with the sprocket-wheel $p$ to be driven by rotation of the shaft $r$. The cylinder communicates through an inlet-pipe $k$ with the carbonic acid gas supply (not shown) and is adapted to be charged thereby to a pressure of one hundred and fifteen pounds to the square inch, or thereabout, a suitable pressure-gage C being provided for indicating the pressure in the agitator.

D is a pump, supported on the bed A; and it is preferably of the double-acting variety illustrated, though it need involve no features of novelty and is therefore not illustrated in detail. The pump-pistons are connected with the cranks $v$ and $v'$ on the shaft $m$. D' is also a pump, shown as of the single-acting variety, and supported on the bed A, this pump having its piston connected with the shaft $m$ at a crank therein, which is hidden from view, but in the same manner as the connection described of the pump D.

The pumps D and D' have a common supply-pipe $i$, which may be understood as leading from a ruh-cask in the cellar of a brewery; and the pump D' discharges through a pipe $i'$ into the cylinder of the agitator B. The pump D discharges through a pipe $i^3$ into a T-head $i^3$ at the base of an upright chamber E, which we term the mixing-chamber, the same being preferably in the shape of a cylinder formed of glass. The agitator B also discharges by way of the T-head $i^3$ into the base of the mixing-chamber E through a tube $i^4$ containing a shut-off valve $h$ having its handle $h'$ connected with one end of a lever $h^2$ fulcrumed at $x$ and, at its opposite end, engaging the cam $m'$. The mixing-chamber E discharges through a pipe or conduit $g$ into a holder F, and we prefer, for the sake of economy in practicing our improved process, that the pipe $g$ shall branch into at least two holders F and F' by entering them at their sides and extending downward therein nearly to their bases as shown at $g'$, a three-way cock $t$ being interposed between the branches of the pipe $g$; the latter also containing a liquid-pressure relief-valve $g^2$, which we set at a comparatively high pressure, say one hundred and fifty pounds to the square inch, or thereabout.

A compressed-air (or other gas) supply-pipe $f$ leads from a compressor or compressed-fluid reservoir (not shown) and branches at a three-way cock $f^2$ into the pipes $f^3$ and $f^4$ containing each a ball-valve $w$, the pipe $f^3$ leading into the holder F near its upper end, and the pipe $f^4$ similarly entering the holder F'. Glass gages $f^5$ and $f^6$ are provided on the holders. Another branch $e$, containing a pressure-reducing valve $d$, leads from the compressed-air pipe $f$ to a three-way cock $e'$, from which it proceeds by the branches $e^2$ and $e^3$, respectively leading into the gages $f^5$ and $f^6$. A branch-pipe $e^4$ containing a pressure-reducing valve $d'$ leads from the branch-pipe $e$ into a back-pressure reservoir G.

At the bases of the holders F and F' are shown branch-pipes $c^2$ and $c^3$ meeting at a suitable three-way cock $c'$, which is adjustable to direct the discharge of the liquid contents of either holder at will into a draw-off pipe $c$ for racking off.

The operation is as follows: The holder to be filled with carbonated beer (say the holder F) is preparatorily filled with air under pressure, say at about forty pounds to the square inch, (the preferred limits being from thirty-five to forty-five pounds) and which is admitted therein by suitably adjusting the valve $f^2$, the valve $e'$ being closed. When the shaft $r$ is geared to the driving power to actuate the pumps D and D', the former pumps, continuously, beer from a ruh-cask through the chamber E and pipe $g$ into the holder. With each stroke of the piston of the pump D' which forces beer into the cylinder of the agitator B containing the supply of supercharged beer, the cam $m'$ actuates the lever $h^2$ to open the valve $h$ and permit a charge of the highly carbonated beer from the agitator to be injected into the mixing-chamber E, entering the latter and mixing with the contents thereof, introduced by the pump D, against a counter-pressure of air in the system of about forty pounds to the square inch, as aforesaid, which prevents the gas from separating. When the holder F is completely full, and has thus displaced the air-pressure therein, and closed the ball-valve $w$ against the mouth of the pipe $f^3$, the pressure under which it is contained in the holder is, accordingly, that of the air-pressure, say forty pounds. It should be stated that the pipe $f$ is vented by a relief-valve $u$ to release all pressure above forty pounds generated by the filling of the holder F against the air-pressure therein. Instead of stopping the action of the pumps D and D', or either of them, after the holder has been completely filled with the beer, it is continued to force more beer into the already full holder, thereby introducing but a very small quantity therein, though that is sufficient to greatly compress the liquid contents of the holder. When this liquid pressure has been raised to that at which the relief-valve $g^2$ is set (say one hundred and fifty pounds), the pipe $g$ will overflow there. Then the pumps and other machinery are stopped instantly by turning the lever $a$ to throw out the clutch $a'$.

The contents of the filled holder may be racked off at any time; but for racking, the pressure in the holder requires to be reduced to the racking-off point, say to fifteen pounds to the square inch.

Preparatory to racking, the valve $f^2$ is shut to take the forty pounds of air-pressure from the pipe $f$ off the holder; and thereupon the valve $e'$ is opened to permit the excessive pressure in the holder (one hundred and fifty pounds to the square inch) to be reduced, which occurs, on opening the valve $e'$, by the surplus liquid contents (a comparatively minute quantity) which generated the great liquid pressure in the holder, spurting out, according to the arrangement shown of the apparatus, through the pipes $e^2$ and $e^3$ into the holder F', whereby it is saved. Thereafter the pressure of air on the beer in the holder F comes from the pipe $f$ through the pipe $e$ and reducing-valve $d$, which is adjusted to reduce the pressure which enters it at forty pounds to fifteen pounds on the outlet side of the valve, and the pressure at fifteen pounds enters the holder F through the pipe $e^2$ and is maintained thereon during the racking operation, or while the beer is being drawn off at the pipe $c$. The back-pressure reservoir G, of course, is only used in racking off, its supply of air-pressure coming from the pipe $f$, through the pipe $e$ and reducing-valve $d$ and thence through the pipe $e^4$ and reducing valve $d'$ therein, which is arranged to still further reduce the pressure, say to fourteen pounds. A relief-valve $u'$ is provided on the reservoir G to permit the venting of any pressure therein in excess of the fourteen pounds.

As will be understood by those skilled in the art, the racking apparatus, which may be of any suitable construction, such as that set forth in the allowed application of Alves M. Hofmann, one of the present applicants, and which was filed March 31, 1894, with the Serial No. 505,882, and entitled "Process of and apparatus for preparing beer and other liquids in receptacles for the market," is to be connected with the pipe c and with the back-pressure reservoir G at a pipe b' indicated by a dotted representation thereon, to hold the gas against escaping from the beer in racking it off.

While the contents of the holder F are being racked off, the holder F' may be undergoing the same operation as that described of the holder F, by turning the valve $f^2$ to fill it with the requisite air-pressure, then actuating the pumps D and D' till the liquid pressure in the holder is raised to, say, one hundred and fifty pounds to the square inch. Then to rack off the contents of the holder F' (while the holder F is again being filled, if desired) the racking pressure is produced, as aforesaid, by closing the valve $f^2$ and by opening the valve e' to admit the surplus liquid from the holder F' into the holder F. We wish it to be understood, however, that our invention is not limited to the employment of more than one holder, with its air-pressure connections, when the valve e' could vent into the open air.

As will be observed, the all-important feature of our improved process is that of raising the liquid pressure of the gas-charged or finished-liquid contents (whatever the manner and means of their introduction) of the holder by forcing additional liquid into the already full holder. The effect of this is, so to speak, that of compressing or squeezing the gas-charged liquid in the holder and, as the result, enhancing greatly the intimacy and permanency of incorporation therewith of its contained gas.

By the term "finished liquid," herein employed to designate the contents of the holder, we mean a liquid fully charged with gas to render it suitable for consumption. To cause this liquid to hold its gas, however, we further subject our finished liquid to what we term a "liquid pressure" of, say, one hundred and fifty pounds in the holder, in which the contents are confined against escape. It will be noticed that this differentiates our process from another process known to us, in which pressure is applied to the liquid while the latter is being carbonated and while it is escaping from the holder.

It is also of great importance for the successful working of our process, that the charging of the beer with gas, or with the supercharged liquid, and forcing it into the holder, shall be against an adequate counterpressure, as of air, though other gas may be employed for exerting the counterpressure.

Beer carbonated according to our improved process may, as experience shows, be exposed for many hours to the atmosphere without losing sufficient of its contained gas to impair it for drinking. In fact the gas, owing to its intimate incorporation with the beer, stays with it, and is only freed readily if the beer be agitated in the air. Moreover the foam of beer carbonated by our improved process is thick, like cream, and very lasting.

The apparatus which we have shown and described is the best known to us for the practice of our process, both in its general construction and in matters of detail; but it may be variously modified without departure from our invention provided any pumping mechanism be employed to force the liquid to be charged with gas through a conduit having an interposed mixing-chamber into a holder against adequate counterpressure, and means be provided for periodically charging the liquid with gas in its course to the holder.

It will, moreover, be noticed, as a distinguishing feature of our apparatus, that the mixing-chamber is interposed between the discharge-end of the pumping mechanism and the holder, whereby passage of the gas-charged liquid through the pump is avoided.

What we claim as new, and desire to secure by Letters Patent, is—

1. The process of enhancing the incorporation, in a finished liquid, of its contained gas, which consists in filling a holder to its capacity with, and confining against escape therefrom the finished liquid and compressing the finished liquid in said holder, substantially as described.

2. The process of enhancing the incorporation in a gas-charged liquid of its contained gas, which consists in first filling to its capacity a holder, with the finished liquid, and thereupon compressing said contents, while under confinement in the holder, by continuing to force liquid against said contents, substantially as described.

3. The process of charging a liquid with gas, which consists in forcing the liquid to be charged into a holder against adequate counterpressure and injecting into said liquid, in its course to said holder and against said counterpressure, a liquid supercharged with gas, thereby filling said holder to its capacity with finished liquid and continuing the forcing operation into said holder, against its confined finished-liquid contents, to raise the liquid-pressure of said contents, substantially as and for the purpose set forth.

4. The process of carbonating beer, which consists in pumping beer into a holder against counterpressure, injecting into said beer, in its course to the holder and against counterpressure, beer supercharged with carbonic acid gas, thereby filling said holder to its capacity with finished liquid and displacing with the beer so charged the counterpressure medium as the supply in the holder increases, and thereupon raising the pressure of liquid while confined against escape in said holder and enhancing the incorporation in it of its contained gas by continuing to pump beer into the holder, substantially as described.

5. The process of carbonating beer and preparing it for racking off, which consists in pumping beer into a holder against counterpressure, injecting into said beer, in its course to the holder and against counterpressure, beer supercharged with carbonic acid gas, thereby filling said holder to its capacity with finished liquid and displacing with the beer so charged the counterpressure medium as the supply in the holder increases, thereupon raising the pressure of liquid while confined against escape in said holder and enhancing the incorporation in it of its contained gas by continuing to pump beer into the holder, and finally discontinuing the supply to the holder and reducing the liquid pressure therein to the racking-off point, substantially as described.

6. The process of carbonating beer, which consists in pumping beer into a holder against counterpressure, mixing of such beer and supercharging it with carbonic acid gas and periodically injecting into said beer, in its course to the holder and against counterpressure, a suitable proportion of the supercharged beer, thereby filling said holder to its capacity with finished liquid and displacing with its liquid contents the counterpressure medium as the supply in the holder increases, and thereupon raising the pressure of liquid while confined against escape in said holder and enhancing the incorporation in it of its contained gas by continuing to pump beer into the holder, substantially as described.

7. The process of carbonating beer and preparing it for racking off, which consists in pumping beer into a holder against a counterpressure of air of forty pounds to the square inch, or thereabout, mixing of such beer and supercharging it with carbonic acid gas and periodically injecting into said beer in its course to the holder and against said counterpressure, a suitable proportion of the supercharged beer, thereby filling said holder to its capacity with finished liquid and overcoming with its contents said counterpressure, as the supply in the holder increases, thereupon raising the pressure of liquid in said holder to one hundred and fifty pounds to the square inch, or thereabout, and thus enhancing the incorporation in it of its contained gas, by continuing to pump beer into the holder, against the finished liquid confined therein from escaping and finally discontinuing the supply to the holder and reducing the liquid-pressure therein to the racking-off point, substantially as described.

8. In an apparatus for charging liquids with gas, the combination with a holder of a pump adapted to be connected with the supply of liquid to be charged, a conduit connecting the pump from its discharge-end with said holder and containing a mixing-chamber interposed between the discharge-end of the pump and the holder, a gas-charging valve-controlled pipe leading from a supply of the charging medium into the mixing-chamber, and means for exerting counterpressure against the flow of liquid through the mixing-chamber and into the holder, substantially as described.

9. In an apparatus for charging liquids with gas, in combination with a holder, a pump adapted to be connected with the supply of liquid to be charged, a conduit connecting the pump from its discharge-end with said holder and containing a mixing-chamber interposed between the discharge-end of the pump and the holder, a receptacle for liquid supercharged with gas, having a valve-controlled pipe connection with the mixing-chamber, and means for exerting counterpressure against the flow of liquid through the mixing-chamber and into the holder, substantially as described.

10. In an apparatus for charging liquids with gas, the combination of a holder provided with a draw-off device for racking, a pump adapted to be connected with the supply of liquid to be charged, a conduit connecting the pump from its discharge-end with said holder and leading downward therein nearly to its base, a mixing-chamber interposed in said conduit between the discharge-end of the pump and the holder, a receptacle for liquid supercharged with gas, having a valve-controlled pipe connection with the mixing-chamber, and means for exerting counterpressure against the flow of liquid through the mixing-chamber and into the holder, substantially as described.

11. In an apparatus for charging liquids with gas, the combination with a holder of a pump adapted to be connected with the supply of liquid to be charged, a conduit connecting the pump from its discharge end with said holder and containing a mixing-chamber interposed between the discharge end of the pump and the holder, a fluid-pressure relief-valve for the overflow from said holder, a gas-charging valve-controlled pipe leading from a supply of the charging medium into the mixing-chamber, and means for exerting counterpressure against the flow of liquid through the mixing-chamber and into the holder, substantially as described.

12. In an apparatus for carbonating beer, the combination with a holder of a pump D and a pump D', communicating from their suction-sides with the beer-supply, an agitator B communicating with the supply of carbonic acid gas and with the discharge-side of the pump D', a conduit $g$ leading from the discharge-side of the pump D into the holder and containing a mixing-chamber E communicating with the agitator through a valve-controlled tube $i^4$, a pressure-relief valve $g^2$ for the overflow from the holder, and counterpressure mechanism on the holder, substantially as and for the purpose set forth.

13. In an apparatus for carbonating beer, the combination with a holder of a pump D and a pump D' communicating from their suction-sides with the beer-supply and operatively connected with a crank-shaft $m$ carrying a cam $m'$, an agitator B communicating with the supply of carbonic acid gas and with the discharge-side of the pump D', a conduit $g$ leading from the discharge-side of the pump D into the holder and containing a mixing-chamber E, a tube $i^4$ connecting the agitator with the mixing-chamber and containing a valve $h$ connected from its handle with a lever $h^2$ extending into the path of said cam, a pressure-relief valve $g^2$ for the overflow from the holder, and counterpressure mechanism on the holder, substantially as and for the purpose set forth.

14. In an apparatus for carbonating beer, the combination with a holder of a pump D adapted to be connected with the supply of beer to be charged, a conduit $g$ connecting the pump from its discharge-end with said holder and containing a mixing-chamber E and a relief-valve $g^2$, an agitator B communicating with a carbonic acid gas supply and discharging into the mixing-chamber through a valve-controlled tube, means for periodically opening the valve in said tube, a pump D' communicating from its suction-end with said beer-supply and discharging into the agitator, a compressed-air supply-pipe $f$ containing a shut-off valve and discharging into said holder, and a vent-pipe $e^2$ leading from the holder and containing a shut-off valve, substantially as and for the purpose set forth.

15. An apparatus for carbonating beer, comprising, in combination, a holder provided with a draw-off pipe, an air-supply pipe $f$ containing a shut-off valve and leading into the holder, a vent-pipe $e^2$ containing a shut-off valve and leading from the holder into a branch $e$ of the pipe $f$ containing a pressure-reducing valve $d$, a back-pressure reservoir G communicating with said branch $e$ through a pipe $e^4$ containing a pressure-reducing valve $d'$, pumping mechanism communicating at its suction-side with the beer-supply and from its discharge-side with the holder through a conduit $g$ containing a pressure-relief valve $g^2$ and a mixing-chamber E, a gas-charged liquid supply discharging into said mixing-chamber through a valve-controlled injector-tube, and means for periodically opening the valve in said injector-tube, the whole being constructed and arranged to operate substantially as described.

ALVES M. HOFMANN.
CHARLES B. VAN HORN.

In presence of—
M. J. FROST,
J. H. LEE.